(12) United States Patent
Fuchs et al.

(10) Patent No.: US 7,732,530 B2
(45) Date of Patent: *Jun. 8, 2010

(54) FLEXIBLE PROPYLENE COPOLYMER COMPOSITIONS HAVING A HIGH TRANSPARENCY

(75) Inventors: Alexander Fuchs, Ferrara (IT); Friederike Morhard, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 338 days.

This patent is subject to a terminal disclaimer.

(21) Appl. No.: 10/517,588

(22) PCT Filed: Jun. 10, 2003

(86) PCT No.: PCT/EP03/06042

§ 371 (c)(1),
(2), (4) Date: Dec. 9, 2004

(87) PCT Pub. No.: WO03/106523

PCT Pub. Date: Dec. 24, 2003

(65) Prior Publication Data

US 2006/0058463 A1 Mar. 16, 2006

Related U.S. Application Data

(60) Provisional application No. 60/394,616, filed on Jul. 9, 2002.

(30) Foreign Application Priority Data

Jun. 12, 2002 (DE) .................. 102 26 183

(51) Int. Cl.
  *C08L 23/00* (2006.01)
  *C08L 23/10* (2006.01)
  *C08L 23/14* (2006.01)
(52) U.S. Cl. ...................... 525/191; 525/240
(58) Field of Classification Search ............... 525/191, 525/240
See application file for complete search history.

(56) References Cited

U.S. PATENT DOCUMENTS

| | | | | |
|---|---|---|---|---|
| 5,232,993 | A | * | 8/1993 | Winter et al. |
| 5,280,074 | A | * | 1/1994 | Schreck et al. |
| 5,753,773 | A | | 5/1998 | Langhauser et al. .......... 525/323 |
| 5,773,516 | A | * | 6/1998 | Huffer et al. .................. 525/242 |
| 6,114,478 | A | * | 9/2000 | Kersting et al. |
| 6,197,900 | B1 | * | 3/2001 | Seelert et al. |
| 6,248,829 | B1 | * | 6/2001 | Fischer et al. ............... 525/191 |
| 6,417,302 | B1 | | 7/2002 | Bohnen ....................... 526/160 |
| 6,495,634 | B2 | * | 12/2002 | Hüffer et al. |
| 6,511,755 | B1 | * | 1/2003 | Mochizuki et al. .......... 428/516 |
| 6,583,227 | B2 | * | 6/2003 | Mehta et al. ................. 525/240 |
| 6,586,528 | B1 | * | 7/2003 | Delaite et al. ............... 525/191 |
| 6,593,442 | B2 | * | 7/2003 | Bidell et al. |
| 6,635,715 | B1 | * | 10/2003 | Datta et al. .................. 525/240 |
| 6,825,280 | B1 | | 11/2004 | Hayakawa et al. .......... 525/240 |
| 7,026,040 | B2 | | 4/2006 | Mehta et al. |
| 7,053,160 | B1 | | 5/2006 | Bingel et al. |
| 2003/0130443 | A1 | | 7/2003 | Hingmann et al. |
| 2003/0149199 | A1 | | 8/2003 | Schottek et al. ............. 526/126 |
| 2006/0167185 | A1 | * | 7/2006 | Fuchs et al. ................. 525/240 |

FOREIGN PATENT DOCUMENTS

| | | | |
|---|---|---|---|
| AU | 718385 | * | 1/1998 |
| DE | 3904469 | * | 8/1990 |
| DE | 4130429 | * | 3/1993 |
| DE | 4317655 | * | 12/1994 |
| DE | 4330667 | * | 3/1995 |
| DE | 19623225 | * | 12/1997 |
| DE | 19653079 | * | 6/1998 |
| DE | 19720980 | * | 11/1998 |
| DE | 19726796 | * | 1/1999 |
| DE | 19962130 | * | 7/2001 |
| DE | 10004660 | * | 8/2001 |
| EP | 433986 | * | 6/1991 |
| EP | 433990 | * | 6/1991 |
| EP | 0646624 | | 4/1995 |
| EP | 0704463 | | 4/1996 |
| EP | 0778294 | | 6/1997 |
| EP | 1002814 | | 5/2000 |
| EP | 885926 | * | 12/2009 |
| JP | 11294567 | * | 10/1999 |
| WO | 9109882 | | 7/1991 |

(Continued)

OTHER PUBLICATIONS

L. Abis et al., "$^{13}$C NMR characterization of a new ethylene-propene copolymer obtained with a high yield titanium catalyst;" *Makromol. Chem.*, vol. 187, p. 1877-1886 (1986).

L. Wild, "Temperature Rising Elution Fractionation;" *Advances in Polymer Science*; vol. 98, p. 1-47 (1990).

H. N. Cheng, "$^{13}$C NMR Analysis of Ethylene-Propylene Rubbers," *Macromolecules*, vol. 17(10), p. 150-155 (1984).

(Continued)

*Primary Examiner*—Nathan M Nutter
(74) *Attorney, Agent, or Firm*—Jarrod N. Raphael

(57) ABSTRACT

The present invention relates to a propylene copolymer composition comprising A) a propylene copolymer containing from 1 to 20% by weight of olefins other than propylene and B) at least one propylene copolymer containing from 5 to 98% by weight of olefins other than propylene, where the propylene copolymer composition is obtainable by means of a two-stage or multistage polymerization using a catalyst system based on metallocene compounds which is used in both stages.

12 Claims, No Drawings

FOREIGN PATENT DOCUMENTS

| | | | |
|---|---|---|---|
| WO | 93/06145 | | 4/1993 |
| WO | 94/28042 | | 12/1994 |
| WO | 98/10016 | | 3/1998 |
| WO | 9906414 | | 2/1999 |
| WO | 99/64490 | | 12/1999 |
| WO | 00/31090 | * | 6/2000 |
| WO | 01/46274 | | 6/2001 |
| WO | 0148034 | | 7/2001 |
| WO | 02/40561 | | 5/2002 |
| WO | 03/045964 | | 6/2003 |
| WO | 03045964 | | 6/2003 |
| WO | 03/106553 | * | 12/2003 |

OTHER PUBLICATIONS

R. Gächter & H Müller, "Plastics Additives Handbook—Stabilizers, Processing Aids, Plasticizers, Fillers, Reinforcements, Colorants for Thermoplastics," $4^{th}$ Edition, Carl Hanser Verlag, Munich, Vienna, New York, Barcelona (1993) (Cover & Copyright pages).

R. Gächter & H Müller, "Plastics Additives Handbook—Stabilizers, Processing Aids, Plasticizers, Fillers, Reinforcements, Colorants for Thermoplastics," 3rd Edition, Carl Hanser Verlag, Munich, Vienna, New York, Barcelona (1993) (Cover, Copyright & Index pages).

* cited by examiner

FLEXIBLE PROPYLENE COPOLYMER COMPOSITIONS HAVING A HIGH TRANSPARENCY

This application is the U.S. national phase of International Application PCT/EP03/06042, filed Jun. 10, 2003, claiming priority to German Patent Application 10226183.0 filed Jun. 12, 2002, and the benefit under 35 U.S.C. 119(e) of U.S. Provisional Application No. 60/394,616, filed Jul. 9, 2002; the disclosures of International Application PCT/EP03/06042, German Patent Application 10226183.0 and U.S. Provisional Application No. 60/394,616, each as filed, are incorporated herein by reference.

The invention relates to propylene copolymer compositions, to a process for producing the propylene copolymer compositions, to the use of the propylene copolymer compositions of the present invention for producing fibers, films or moldings and also to fibers, films or moldings comprising the propylene copolymer compositions of the present invention.

Polymers of propylene can be processed to form shaped bodies which have advantageous mechanical properties, especially a high hardness, stiffness and shape stability. Consumer articles made of propylene polymers are used in a wide range of applications, e.g. as plastic containers, as household or office articles, toys or laboratory requisites. However, the products known from the prior art are not satisfactory for many applications, since a combination of low stiffness with good transparency is frequently desired.

It is known that multiphase propylene copolymers having a good impact toughness and a decreasing stiffness can be prepared by means of Ziegler-Natta catalyst systems in a multistage polymerization reaction. However, the incorporation of ethylene-propylene copolymers having a high proportion of ethylene into a polymer matrix makes the multiphase propylene copolymer turbid. Poor miscibility of the flexible phase with the polymer matrix leads to a separation of the phases and thus to turbidity and to poor transparency values of the heterogeneous copolymer. Furthermore, the ethylene-propylene rubber prepared by means of conventional Ziegler-Natta catalysts also has a very inhomogeneous composition.

It is also known that multiphase copolymers of propylene can be prepared using metallocene catalyst systems. Propylene polymers prepared using metallocene catalyst systems have low extractable contents, a homogeneous comonomer distribution and good organoleptics.

WO 93/06145, WO 94/28042 and EP-A 1 002 814 describe multiphase copolymers of propylene. However, propylene copolymer compositions having a propylene copolymer matrix are not disclosed for example.

EP-A 646 624 describes multiphase propylene copolymer compositions having a propylene copolymer matrix, but the components have each been polymerized individually and then mixed.

WO 01/48034 relates to metallocene compounds by means of which propylene copolymers having a high molar mass and a high copolymerized ethylene content can be obtained under industrially relevant polymerization conditions. Multiphase propylene copolymers having a high stiffness/impact toughness level are obtainable in this way. However, no flexible propylene copolymer compositions having a high transparency are described.

It is an object of the present invention to overcome the above-described disadvantages of the prior art and to provide propylene copolymer compositions which have a combination of low stiffness and at the same time a good transparency. Furthermore, they should have a low proportion of n-hexane-soluble material, a high impact toughness, in particular at low temperatures, good stress whitening behavior and a shrinkage behavior corresponding to propylene polymers and also a homogeneous comonomer distribution and good organoleptics.

We have found that this object is achieved by propylene copolymer compositions comprising A) a propylene copolymer containing from 1 to 20% by weight of olefins other than propylene and
B) at least one propylene copolymer containing from 5 to 98% by weight of olefins other than propylene, where the propylene copolymer composition is obtainable by means of a two-stage or multistage polymerization using a catalyst system based on metallocene compounds which is used in both stages.

Furthermore, we have found a process for preparing propylene copolymer compositions, the use of the propylene copolymer compositions for producing fibers, films or moldings and also fibers, films or moldings which comprise propylene copolymer compositions of the present invention, preferably as substantial component.

The propylene copolymer A present in the propylene copolymer compositions of the present invention and the propylene copolymer present as component B are preferably present as separate phases. Propylene copolymer compositions having such a structure are also referred to as multiphase propylene copolymers, heterogeneous propylene copolymers or as propylene block copolymers.

In the multiphase propylene copolymer compositions of the present invention, the propylene copolymer A usually forms a three-dimensionally coherent phase in which the phase of the propylene copolymer B is embedded. Such a coherent phase in which one or more other phases are dispersed is frequently referred to as the matrix. The matrix usually also makes up the major proportion by weight of the polymer composition.

In the multiphase propylene copolymer compositions of the present invention, the propylene copolymer B is generally dispersed in finely divided form in the matrix. Furthermore, the diameter of the then isolated domains of the propylene copolymer B is usually from 100 nm to 1000 nm.

Preference is given to a geometry with a length in the range from 100 nm to 1000 nm and a thickness in the range from 100 to 300 nm. The determination of the geometry of the individual phases of the propylene copolymer compositions can be carried out, for example, by evaluation of contrasted transmission electron micrographs (TEMs).

To prepare the propylene polymers present in the propylene copolymer compositions of the present invention, at least one further olefin is used as monomer in addition to propylene. As comonomers in the propylene copolymers A and B, all olefins other than propylene, in particular $\alpha$-olefins, i.e. hydrocarbons having terminal double bonds, are conceivable. Preferred $\alpha$-olefins are linear or branched $C_2$-$C_{20}$-1-alkenes other than propylene, in particular linear $C_2$-$C_{10}$-1-alkenes or branched $C_2$-$C_{10}$-1-alkenes, e.g. 4-methyl-1-pentene, conjugated and unconjugated dienes such as 1,3-butadiene, 1,4-hexadiene or 1,7-octadiene or vinylaromatic compounds such as styrene or substituted styrene. Suitable olefins also include olefins in which the double bond is part of a cyclic structure which may comprise one or more ring systems. Examples are cyclopentene, norbornene, tetracyclododecene or methylnorbornene or dienes such as 5-ethylidene-2-norbornene, norbornadiene or ethylnorbornadiene. It is also possible to copolymerize mixtures of two or more olefins with propylene. Particularly preferred olefins are ethylene and linear $C_4$-$C_{10}$-1-alkenes such as 1-butene, 1-pentene, 1-hexene, 1-heptene, 1-octene, 1-decene, in particular ethylene and/or 1-butene. It is also possible to use different comonomers or comonomer mixtures for preparing the propylene copolymers A and B.

The propylene copolymer A present in the propylene copolymer compositions of the present invention is a propylene copolymer containing from 1 to 20% by weight of olefins other than propylene. Preferred propylene copolymers contain from 2 to 10% by weight, in particular from 2.5 to 5% by weight, of olefins other than propylene. As comonomers, preference is given to using ethylene or linear $C_4$-$C_{10}$-1-alkenes or mixtures thereof, in particular ethylene and/or 1-butene. The propylene polymer A preferably has an isotactic structure, which hereinafter means that, with the exception of a few defects, all methyl side groups are arranged on the same side of the polymer chain.

The molar mass $M_n$ of the propylene copolymer A is preferably in the range from 50,000 g/mol to 500,000 g/mol, particularly preferably in the range from 50,000 g/mol to 200,000 g/mol and very particularly preferably in the range from 80,000 g/mol to 150,000 g/mol.

The component B present in the propylene copolymer compositions of the present invention is made up of at least one propylene copolymer containing from 5 to 98% by weight of olefins other than propylene. It is also possible for two or more propylene copolymers which are different from one another to be present as component B; these may differ in respect of both the amount and type of the copolymerized olefin(s) other than propylene. Preferred comonomers are ethylene or linear $C_4$-$C_{10}$-1-alkenes or mixtures thereof, in particular ethylene and/or 1-butene. In a further, preferred embodiment, monomers containing at least two double bonds, e.g. 1,7-octadiene or 1,9-decadiene, are additionally used. The content of the olefins other than propylene in the propylene copolymers is generally from 7 to 50% by weight, preferably from 10 to 30% by weight, particularly preferably from 12 to 20% by weight and in particular from 14% by weight to 17% by weight, based on the propylene copolymer B.

The molar mass $M_n$ of the propylene copolymer B is preferably in the range from 50,000 g/mol to 500,000 g/mol, particularly preferably in the range from 50,000 g/mol to 200,000 g/mol and very particularly preferably in the range from 80,000 g/mol to 150,000 g/mol.

The weight ratio of propylene copolymer A to propylene copolymer B can vary. It is preferably from 90:10 to 20:80, particularly preferably form 80:20 to 50:50 and very particularly preferably from 70:30 to 60:40. Here, propylene copolymer B includes all the propylene copolymers forming the component B.

The proportion of n-hexane-soluble material in the propylene copolymer compositions of the present invention is preferably $\leq$2.6% by weight, particularly preferably $\leq$1.8% by weight and in particular 1.0% by weight. According to the present invention, the determination of the proportion of n-hexane-soluble material is carried out by a modified FDA method by extraction of about 2.5 g of material with one liter of n-hexane at 50° C. According to the FDA method, an extruded film is used as sample. However, in the case of the propylene copolymer compositions of the present invention, the same values for the proportion of n-hexane-soluble material are obtained using samples composed of granulated material or a granulated material which has been milled to a mean particle diameter of, for example, 100 µm.

Furthermore, the propylene copolymer compositions of the present invention preferably have a haze value of $\leq$30%, more preferably $\leq$20%, particularly preferably $\leq$15% and very particularly preferably less than 10%, based on a film thickness of the propylene copolymer composition of 1 mm. The haze value is a measure of the turbidity of the material and is thus a parameter which characterizes the transparency of the propylene copolymer compositions. The lower the haze value, the higher the transparency. Furthermore, the haze value is also dependent on the film thickness. The thinner the layer, the lower the haze value. The haze value is generally measured in accordance with the standard ASTM D 1003, with different test specimens being able to be used. According to the present invention, the propylene copolymer compositions are characterized by means of the haze value of injection-molded test specimens having a thickness of 1 mm.

The propylene copolymer compositions of the present invention have a low stiffness, i.e. a high flexibility. Preferred propylene copolymer compositions of the present invention have a tensile E modulus determined in a tensile test in accordance with ISO 527-2:1993 in the range from 100 to 1500 MPa, preferably from 150 MPa to 800 MPa and in particular in the range from 200 MPa to 500 MPa, particularly preferably in the range from 200 MPa to 500 MPa.

Propylene polymers are tough materials at room temperature, i.e. plastic deformation occurs under mechanical stress only before the material breaks. However, at reduced temperatures, propylene polymers display brittle fracture, i.e. fracture occurs virtually without deformation or at a high propagation rate. A parameter which describes the temperature at which the deformation behavior changes from tough to brittle is the "brittle/tough transition temperature".

In the propylene copolymer compositions of the present invention, the propylene copolymer A is generally present as matrix and the propylene copolymer B, which usually has a stiffness lower than that of the matrix and acts as impact modifier, is dispersed therein in finely divided form. Such an impact modifier not only increases the toughness at elevated temperatures but also reduces the brittle/tough transition temperature. For the purposes of the present invention, the brittle/tough transition temperature is determined by means of puncture tests in accordance with ISO 6603-2, in which the temperature is reduced in continuous steps. The force/displacement graphs recorded in the puncture tests enable conclusions as to the deformation behavior of the test specimens at the respective temperature to be drawn and thus allow the brittle/tough transition temperature to be determined. To characterize the specimens according to the present invention, the temperature is reduced in steps of 2° C. and the brittle/tough transition temperature is defined as the temperature at which the total deformation is at least 25% below the mean total deformation of the preceding 5 measurements; here, the total deformation is the displacement through which the punch has traveled when the force has passed through a maximum and dropped to 3% of this maximum force. In the case of specimens which do not display a sharp transition and in which none of the measurements meet the specified criterion, the total deformation at 23° C. is employed as reference value and the brittle/tough transition temperature is the temperature at which the total deformation is at least 25% below the total deformation at 23° C. Preferred propylene copolymer compositions of the present invention have a brittle/tough transition temperature of $\leq$-15° C., preferably $\leq$-18° C. and particularly preferably $\leq$-20° C. Very particular preference is given to brittle/tough transition temperatures of $\leq$-22° C. and in particular $\leq$-26° C.

Furthermore, the propylene copolymer compositions of the present invention usually display good stress whitening behavior. For the purposes of the present invention, stress whitening is the occurrence of whitish discoloration in the stressed region when the polymer is subjected to mechanical stress. In general, it is assumed that the white discoloration is caused by small voids being formed in the polymer under mechanical stress. Good stress whitening behavior means that no or only very few regions having a whitish discoloration occur under mechanical stress.

One method of quantifying stress whitening behavior is to subject defined test specimens to a defined impact stress and then to measure the size of the resulting white spots. Accordingly, in the dome method, a falling dart is dropped onto a test specimen in a falling dart apparatus in accordance with DIN 53443 Part 1. In this method, a falling dart having a mass of 250 g and a punch of 5 mm in diameter is used. The dome radius is 25 mm and the drop is 50 cm. The test specimens used are injection-molded circular disks having a diameter of 60 mm and a thickness of 2 mm, and each test specimen is subjected to only one impact test. The stress whitening is reported as the diameter of the visible stress whitening region in mm; the value reported is in each case the mean of 5 test specimens and the individual values are determined as the mean of the two values in the flow direction on injection molding and perpendicular thereto on the side of the circular disk opposite that on which impact occurs.

The propylene copolymer compositions of the present invention generally display no or only very little stress whitening determined by the dome method at 23° C. In the case of preferred propylene copolymer compositions, a value of from 0 to 8 mm, preferably from 0 to 5 mm and in particular from 0 to 2.5 mm, is determined by the dome method at 23° C. Very particularly preferred propylene copolymer compositions display no stress whitening at all in the test carried out by the dome method at 23° C.

The propylene copolymer compositions of the present invention generally further comprise customary amounts of customary additives known to those skilled in the art, e.g. stabilizers, lubricants and mold release agents, fillers, nucleating agents, antistatics, plasticizers, dyes, pigments or flame retardants. In general, these are incorporated during granulation of the pulverulent product obtained in the polymerization.

Customary stabilizers include antioxidants such as sterically hindered phenols, processing stabilizers such as phosphites or phosphonites, acid scavengers, such as calcium stearate or zinc stearate or dihydrotalcite, sterically hindered amines or UV stabilizers. In general, the propylene copolymer compositions of the present invention contain one or more stabilizers in amounts of up to 2% by weight.

Suitable lubricants and mold release agents are, for example, fatty acids, calcium or zinc salts of fatty acids, fatty acid amides or low molecular weight polyolefin waxes, which are usually used in concentrations of up to 2% by weight.

Possible fillers are, for example, talc, chalk or glass fibers, and these are usually used in amounts of up to 50% by weight.

Examples of suitable nucleating agents are inorganic additives such as talc, silica or kaolin, salts of monocarboxylic or polycarboxylic acids, e.g. sodium benzoate or aluminum tert-butylbenzoate, dibenzylidenesorbitol or its $C_1$-$C_8$-alkyl-substituted derivatives such as methyldibenzylidenesorbitol, ethyldibenzylidenesorbitol or dimethyldibenzylidenesorbitol or salts of diesters of phosphoric acid, e.g. sodium 2,2'-methylenebis(4,6,-di-tert-butylphenyl)phosphate. The nucleating agent content of the propylene copolymer composition is generally up to 5% by weight.

Such additives are generally commercially available and are described, for example, in Gächter/Müller, Plastics Additives Handbook, 4th Edition, Hansa Publishers, Munich, 1993.

In a preferred embodiment, the propylene copolymer compositions of the present invention contain from 0.1 to 1% by weight, preferably from 0.15 to 0.25% by weight, of a nucleating agent, in particular dibenzylidenesorbitol or a dibenzylidenesorbitol derivative, particularly preferably dimethyldibenzylidenesorbitol.

The properties of the propylene copolymer compositions of the present invention are determined essentially by the glass transition temperature of the propylene copolymers B. One way of determining the glass transition temperature of the propylene copolymers B present in the propylene copolymer compositions is examination of the propylene copolymer compositions by means of DMTA (dynamic mechanical thermal analysis), in which the deformation of a sample under the action of a sinusoidally oscillating force is measured as a function of temperature. Here, both the amplitude and the phase shift of the deformation versus the applied force are determined. Preferred propylene copolymer compositions have glass transition temperatures of the propylene copolymers B in the range from −20° C. to −40° C., preferably from −25° C. to −38° C., particularly preferably from −28° C. to −35° C. and very particularly preferably from −31° C. to −34° C.

The glass transition temperature of the propylene copolymers B is determined essentially by their composition and especially by the proportion of copolymerized comonomers other than propylene. The glass transition temperature of the propylene copolymers B can thus be controlled via the type of monomers used in the polymerization of the propylene copolymers B and their ratios. For example, in the case of propylene copolymer compositions prepared using propylene-ethylene copolymers as propylene copolymer B, an ethylene content of 16% by weight corresponds to a glass transition temperature of from −33° C. to −35° C.

The composition of the propylene copolymers B present in the propylene copolymer compositions of the present invention is preferably uniform. This distinguishes them from conventional heterogeneous propylene copolymers which are polymerized using Ziegler-Natta catalysts, since the use of Ziegler-Natta catalysts results in blockwise incorporation of the comonomer into the propylene copolymer even at low comonomer concentrations, regardless of the polymerization process.

For the purposes of the present invention, the term "incorporated blockwise" indicates that two or more comonomer units follow one another directly. The uniform incorporation of the propylene copolymers B also results in the propylene copolymers A and B being more compatible with one another.

In the case of preferred propylene copolymer compositions obtained from propylene and ethylene, the structure of the propylene-ethylene copolymers B can be determined by means of $^{13}C$-NMR spectroscopy. Evaluation of the spectrum is prior art and can be carried out by a person skilled in the art using, for example, the method described by H. N. Cheng, Macromolecules 17 (1984), pp. 1950-1955 or L. Abis et al., Makromol. Chemie 187 (1986), pp. 1877-1886. The structure can then be described by the proportions of "$PE_x$" and of "PEP", where $PE_x$ refers to the propylene-ethylene units having $\geq 2$ successive ethylene units and PEP refers to the propylene-ethylene units having an isolated ethylene unit between two propylene units. Preferred propylene copolymer compositions obtained from propylene and ethylene have a $PEP/PE_x$ ratio of $\geq 0.75$, preferably $\geq 0.85$ and particularly preferably in the range from 0.85 to 2.5 and in particular in the range from 1.0 to 2.0.

Preference is also given to propylene copolymers B which have an isotactic structure with regard to subsequently incorporated propylene units.

The properties of the propylene copolymer compositions of the present invention are also determined by the viscosity ratio of the propylene copolymer B and the propylene copolymer A, i.e. the ratio of the molar mass of the dispersed phase to the molar mass of the matrix. In particular, this influences the transparency.

To determine the viscosity ratio, the propylene copolymer compositions can be fractionated by means of TREF fractionation (Temperature Rising Elution Fractionation). The propylene copolymer B is then the combined fractions which are eluted by xylene at temperatures up to and including 70° C. The propylene copolymer A is obtained from the combined fractions which are eluted by xylene at temperatures above 70° C. However, at high comonomer contents in the propylene comonomers A, a clean TREF fractionation presents difficulties since the elution temperature of the propylene copolymer A drops below 70° C. with increasing comonomer content. One way of obtaining information about the individual components is to carry out the examination of the propylene copolymer A using the polymer taken from the reactor directly after the first polymerization step. The propylene copolymer B can be separated from the product of a separate test run in which a polymerization identical to that for the propylene copolymer composition to be examined has been carried out but with no addition of comonomer in the first polymerization step, i.e. a propylene homopolymer has been prepared. The shear viscosity of the polymers is determined on the components obtained in this way. The determination is usually carried out by a method based on ISO 6721-10 using a rotation viscometer having a plate/plate geometry, diameter=25 mm, amplitude=0.05-0.5, preheating time=10-12 min, at a temperature of from 200 to 230° C. The ratio of the shear viscosity of propylene copolymer B to that of propylene copolymer A is then reported at a shear rate of $100\ s^{-1}$.

In preferred propylene copolymer compositions, the ratio of the shear viscosity of propylene copolymer B to that of propylene copolymer A at a shear rate of $100\ s^{-1}$ is in the range from 0.3 to 2.5, preferably from 0.5 to 2 and particularly preferably in the range from 0.7 to 1.75.

The propylene copolymer compositions of the present invention preferably have a narrow molar mass distribution $M_w/M_n$. The molar mass distribution $M_w/M_n$ is, for the purposes of the invention, the ratio of the weight average molar mass $M_w$ to the number average molar mass $M_n$. The molar mass distribution $M_w/M_n$ is preferably in the range from 1.5 to 3.5, particularly preferably in the range from 2 to 2.5 and in particular in the range from 2 to 2.3.

The molar mass $M_n$ of the propylene copolymer compositions of the present invention is preferably in the range from 50,000 g/mol to 500,000 g/mol, particularly preferably in the range from 50,000 g/mol to 200,000 g/mol and very particularly preferably in the range from 80,000 g/mol to 150,000 g/mol.

The present invention further provides for the preparation of the propylene copolymers present in the propylene copolymer compositions of the present invention. This is preferably carried out in a multistage polymerization process comprising at least two successive polymerization steps which are generally carried out in a reactor cascade. It is possible to use the customary reactors employed for the preparation of propylene polymers.

The polymerization can be carried out in a known manner in bulk, in suspension, in the gas phase or in a supercritical medium. It can be carried out batchwise or preferably continuously. Solution processes, suspension processes, stirred gas-phase processes or gas-phase fluidized-bed processes are possible. As solvents or suspension media, it is possible to use inert hydrocarbons, for example isobutane, or else the monomers themselves. It is also possible to carry out one or more steps of the process of the present invention in two or more reactors. The size of the reactors is not of critical importance for the process of the present invention. It depends on the output which is to be achieved in the individual reaction zone(s).

Preference is given to processes in which the polymerization in the second step in which the propylene copolymer(s) B is/are formed takes place from the gas phase. The preceding polymerization of the propylene copolymers A can be carried out either in block, i.e. in liquid propylene as suspension medium, or else from the gas phase. If all polymerizations take place from the gas phase, they are preferably carried out in a cascade comprising stirred gas-phase reactors which are connected in series and in which the pulverulent reaction bed is kept in motion by means of a vertical stirrer. The reaction bed generally consists of the polymer which is polymerized in the respective reactor. If the initial polymerization of the propylene copolymers A is carried out in bulk, preference is given to using a cascade made up of one or more loop reactors and one or more gas-phase fluidized-bed reactors. The preparation can also be carried out in a multizone reactor.

To prepare the propylene copolymers present in the propylene copolymer compositions of the present invention, preference is given to using catalyst systems based on metallocene compounds of transition metals of group 3, 4, 5 or 6 of the Periodic Table of the Elements.

Particular preference is given to catalyst systems based on metallocene compounds of the formula (I),

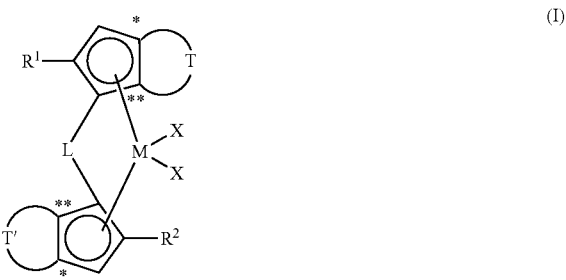

where

M is zirconium, hafnium or titanium, preferably zirconium,

X are identical or different and are each, independently of one another, hydrogen or halogen or an —R, —OR, —OSO$_2$CF$_3$, —OCOR, —SR, —NR$_2$ or —PR$_2$ group, where R is linear or branched C$_1$-C$_{20}$-alkyl, C$_3$-C$_{20}$-cycloalkyl which may be substituted by one or more C$_1$-C$_{10}$-alkyl radicals, C$_6$-C$_{20}$-aryl, C$_7$-C$_{20}$-alkylaryl or C$_7$-C$_{20}$-arylalkyl and may contain one or more heteroatoms of groups 13-17 of the Periodic Table of the Elements or one or more unsaturated bonds, preferably C$_1$-C$_{10}$-alkyl such as methyl, ethyl, n-propyl, isopropyl, n-butyl, isobutyl, sec-butyl, tert-butyl, n-pentyl, n-hexyl, n-heptyl or n-octyl or C$_3$-C$_{20}$-cycloalkyl such as cyclopentyl or cyclohexyl, where the two radicals X may also be joined to one another and preferably form a C$_4$-C$_{40}$-dienyl ligand, in particular a 1,3-dienyl ligand, or an —OR'O— group in which the substituent R' is a divalent group selected from the group consisting of $C_1$-$C_{40}$-alkylidene, $C_6$-$C_{40}$-arylidene, $C_7$-$C_{40}$-alkylarylidene and $C_7$-$C_{40}$-arylalkylidene, where X is preferably a halogen atom or an —R or —OR group or the two radicals X form an —OR'O— group and X is particularly preferably chlorine or methyl, L is a divalent bridging group selected from the group consisting of $C_1$-$C_{20}$-alkylidene radicals, $C_3$-$C_{20}$-cycloalkylidene radicals, $C_6$-$C_{20}$-arylidene radicals, $C_7$-$C_{20}$-alkylarylidene radicals and $C_7$-$C_{20}$-arylalkylidene radicals, which may contain heteroatoms of groups 13-17 of the Periodic Table of the Elements, or a silylidene group having up to 5 silicon atoms, e.g. —SiMe$_2$- or —SiPh$_2$-, where L preferably is a radical selected from the group consisting of —SiMe$_2$-, —SiPh$_2$-, —SiPhMe-, —SiMe(SiMe$_3$)-, —CH$_2$—, —(CH$_2$)$_2$—, —(CH$_2$)$_3$— and —C(CH$_3$)$_2$—, $R^1$ is linear or branched $C_1$-$C_{20}$-alkyl, $C_3$-$C_{20}$-cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, where $R^1$ is preferably unbranched in the α position and is preferably a linear or branched $C_1$-$C_{10}$-alkyl group which is unbranched in the α position, in particular a linear $C_1$-$C_4$-alkyl group such as methyl, ethyl, n-propyl or n-butyl, $R^2$ is a group of the formula —$C(R^3)_2R^4$, where $R^3$ are identical or different and are each, independently of one another, linear or branched $C_1$-$C_{20}$-alkyl, $C_3$-$C_{20}$-Cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, or two radicals $R^3$ may be joined to form a saturated or unsaturated $C_3$-$C_{20}$-ring, where $R^3$ is preferably a linear or branched $C_1$-$C_{10}$-alkyl group, and $R^4$ is hydrogen or linear or branched $C_1$-$C_{20}$-alkyl, $C_3$-$C_{20}$-cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, where $R^4$ is preferably hydrogen, T and T' are divalent groups of the formulae (II), (III), (IV), (V) or (VI),

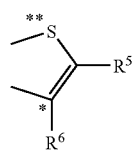
(II)

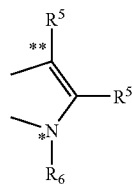
(III)

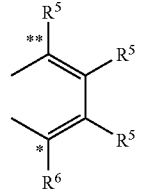
(IV)

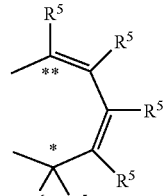
(V)

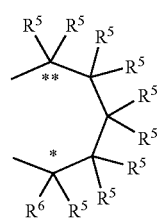
(VI)

where the atoms denoted by the symbols * and ** are joined to the atoms of the compound of the formula (I) which are denoted by the same symbol, and $R^5$ are identical or different and are each, independently of one another, hydrogen or halogen or linear or branched $C_1$-$C_{20}$-alkyl, $C_3$-$C_{20}$-cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, where $R^5$ is preferably hydrogen or a linear or branched $C_1$-$C_{10}$-alkyl group, in particular a linear $C_1$-$C_4$-alkyl group such as methyl, ethyl, n-propyl or n-butyl, and $R^6$ are identical or different and are each, independently of one another, halogen or linear or branched $C_1$-$C_{20}$-alkyl, $C_3$-$C_{20}$-cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, where $R^6$ is preferably an aryl group of the formula (VII),

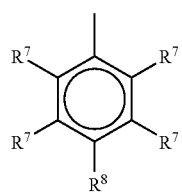
(VII)

where $R^7$ are identical or different and are each, independently of one another, hydrogen or halogen or linear or branched $C_1$-$C_{20}$-alkyl, $C_3$-$C_{20}$-cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, or two radicals $R^7$ may be joined to form a saturated or unsaturated $C_3$-$C_{20}$ ring, where $R^7$ is preferably a hydrogen atom, and $R^8$ is hydrogen or halogen or linear or branched $C_1$-$C_{20}$-alkyl, $C_3$-$C_{20}$-cycloalkyl which may be substituted by one or more $C_1$-$C_{10}$-alkyl radicals, $C_6$-$C_{20}$-aryl, $C_7$-$C_{20}$-alkylaryl or $C_7$-$C_{20}$-arylalkyl and may contain one or more heteroatoms of groups 13-17 of the Periodic Table of the Elements or one or more unsaturated bonds, where $R^8$ is preferably a branched alkyl group of the formula —$C(R^9)_3$, where $R^9$ are identical or different and are each, independently of one another, a linear or branched $C_1$-$C_6$-alkyl group or two or three of the radicals $R^9$ are joined to form one or more ring systems.

It is preferred that at least one of the groups T and T' is substituted by a radical $R^6$ of the formula (VII); it is particularly preferred that both groups are substituted by such a radical. Very particular preference is given to at least one of the groups T and T' being a group of the formula (IV) which is substituted by a radical $R^6$ of the formula (VII) and the other either has the formula (II) or (IV) and is likewise substituted by a radical $R^6$ of the formula (VII).

The greatest preference is given to catalyst systems based on metallocene compounds of the formula (VIII),

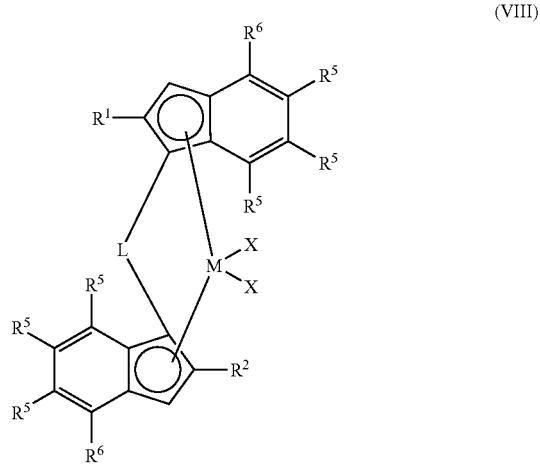

(VIII)

Particularly useful metallocene compounds and methods of preparing them are described, for example, in WO 01/48034 and the European patent application No. 01204624.9.

The metallocene compounds of the formula (I) are preferably used in the rac or pseudorac form, where the pseudorac form is a complex in which the two groups T and T' are in the rac arrangement relative to one another when all other substituents are disregarded. Such metallocene lead to polypropylenes having a predominantly isotactic structure.

It is also possible to use mixtures of various metallocene compounds or mixtures of various catalyst systems. However, preference is given to using only one catalyst system comprising one metallocene compound, which is used for the polymerization of the propylene copolymer A and the propylene copolymer B.

Examples of useful metallocene compounds are
dimethylsilanediyl(2-ethyl-4-(4'-tert-butylphenyl)indenyl) (2-isopropyl-4-(4'-tert-butylphenyl)indenyl)zirconium dichloride,
dimethylsilanediyl(2-methyl-4-(4'-tert-butylphenyl)indenyl) (2-isopropyl-4-(1-naphthyl)indenyl)-zirconium dichloride,
dimethylsilanediyl(2-methyl-4-phenyl-1-indenyl)(2-isopropyl-4-(4'-tert-butylphenyl)-1-indenyl)-zirconium dichloride,
dimethylsilanediyl(2-methylthiapentenyl)(2-isopropyl-4-(4'-tert-butylphenyl)indenyl)zirconium dichloride,
dimethylsilanediyl(2-isopropyl-4-(4'-tert-butylphenyl)indenyl)(2-methyl-4,5-benzindenyl)zirconium dichloride,
dimethylsilanediyl(2-methyl-4-(4'-tert-butylphenyl)indenyl) (2-isopropyl-4-(4-tert-butylphenyl)indenyl)zirconium dichloride,
dimethylsilanediyl(2-methyl-4-(4'-tert-butylphenyl)indenyl) (2-isopropyl-4-phenylindenyl)zirconium dichloride,
dimethylsilanediyl(2-ethyl-4-(4'-tert-butylphenyl)indenyl) (2-isopropyl-4-phenyl)indenyl)zirconium dichloride and
dimethylsilanediyl(2-isopropyl-4-(4'-tert-butylphenyl)indenyl)(2-methyl-4-(1-naphthyl)indenyl)-zirconium dichloride and mixtures thereof.

The preferred catalyst systems based on metallocene compounds generally further comprise cation-forming compounds as cocatalysts. Suitable cation-forming compounds which are able to react with the metallocene compound to convert it into a cationic compound are, for example, compounds such as an aluminoxane, a strong uncharged Lewis acid, an ionic compound having a Lewis-acid cation or an ionic compound containing a Brönsted acid as cation. The cation-forming compounds are frequently also referred to as compounds which form metallocenium ions.

As aluminoxanes, it is possible to use, for example, the compounds described in WO 00/31090. Particularly useful compounds are open-chain or cyclic aluminoxane compounds of the formula (IX) or (X)

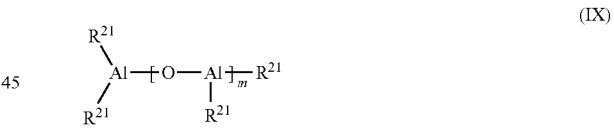

(IX)

(X)

where $R^{21}$ is a $C_1$-$C_4$-alkyl group, preferably a methyl or ethyl group, and m is an integer from 5 to 30, preferably from 10 to 25.

These oligomeric aluminoxane compounds are usually prepared by reacting a solution of trialkylaluminum with water. The oligomeric aluminoxane compounds obtained in this way are generally in the form of mixtures of both linear and cyclic chain molecules of various lengths, so that m is to be regarded as a mean. The aluminoxane compounds can also be present in admixture with other metal alkyls, preferably aluminum alkyls.

Furthermore, modified aluminoxanes in which some of the hydrocarbon radicals or hydrogen atoms are replaced by alkoxy, aryloxy, siloxy or amide radicals may be used in place of the aluminoxane compounds of the formulae (IX) or (X).

It has been found to be advantageous to use the metallocene compounds and the aluminoxane compounds in such amounts that the atomic ratio of aluminum from the aluminoxane compounds to the transition metal from the metallocene compound is in the range from 10:1 to 1000:1, preferably from 20:1 to 500:1 and in particular in the range from 30:1 to 400:1.

As strong, uncharged Lewis acids, preference is given to compounds of the formula (XI)

$$M^2X^1X^2X^3 \tag{XI}$$

where $M^2$ is an element of group 13 of the Periodic Table of the Elements, in particular B, Al or G and preferably B, $X^1$, $X^2$ and $X^3$ are each hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl radical and from 6 to 20 carbon atoms in the aryl radical, or fluorine, chlorine, bromine or iodine, in particular a haloaryl, preferably pentafluorophenyl.

Further examples of strong, uncharged Lewis acids are mentioned in WO 00/31090.

Particular preference is given to compounds of the formula (XI) in which $X^1$, $X^2$ and $X^3$ are identical, preferably tris(pentafluorophenyl)borane.

Strong uncharged Lewis acids suitable as cation-forming compounds also include the reaction products from the reaction of a boronic acid with two equivalents of a trialkylaluminum or the reaction products from the reaction of a trialkylaluminum with two equivalents of an acidic fluorinated, in particular perfluorinated, carbon compound such as pentafluorophenol or bis(pentafluorophenyl) borinic acid.

Suitable ionic compounds containing Lewis-acid cations include salt-like compounds of the cation of the formula (XII)

$$[(Y^{a+})Q_1Q_2 \ldots Q_z]^{d+} \tag{XII}$$

where

Y is an element of groups 1 to 16 of the Periodic Table of the Elements, $Q_1$ to $Q_z$ are singly negatively charged groups such as $C_1$-$C_{28}$-alkyl, $C_6$-$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$-$C_{10}$-cycloalkyl which may be substituted by $C_1$-$C_{10}$-alkyl groups, or halogen, $C_1$-$C_{28}$-alkoxy, $C_6$-$C_{15}$-aryloxy, silyl or mercapto groups, a is an integer from 1 to 6 and z is an integer from 0 to 5, d is the difference a-z, but d is greater than or equal to 1.

Particularly useful Lewis-acid cations are carbonium cations, oxonium cations and sulfonium cations and also cationic transition metal complexes. Particular mention may be made of the triphenylmethyl cation, the silver cation and the 1,1'-dimethylferrocenyl cation. They preferably have noncoordinating counterions, in particular boron compounds as are mentioned in WO 91/09882, preferably tetrakis(pentafluorophenyl)borate.

Salts having noncoordinating anions can also be prepared by combining a boron or aluminum compound, e.g. an aluminum alkyl, with a second compound which can react to link two or more boron or aluminum atoms, e.g. water, and a third compound which forms an ionizing ionic compound with the boron or aluminum compound, e.g. triphenylchloromethane.

A fourth compound which likewise reacts with the boron or aluminum compound, e.g. pentafluorophenol, can additionally be added.

Ionic compounds containing Brönsted acids as cations preferably likewise have noncoordinating counterions. As Brönsted acids, particular preference is given to protonated amine or aniline derivatives. Preferred cations are N,N-dimethylanilinium, N,N-dimethylcylohexylammonium and N,N-dimethylbenzylammonium and also derivatives of the latter two.

Preferred ionic compounds C) are, in particular, N,N-dimethylanilinium tetrakis(pentafluorophenyl)borate, N,N-dimethylcyclohexylammonium tetrakis(pentafluorophenyl)borate and N,N-dimethylbenzylammonium tetrakis(pentafluorophenyl)borate.

It is also possible for two or more borate anions to be joined to one another, as in the dianion $[(C_6F_5)_2B—C_6F_4—B(C_6F_5)_2]^{2-}$, or the borate anion can be bound via a bridge having a suitable functional group to the support surface.

Further suitable cation-forming compounds are listed in WO 00/31090.

The amount of strong, uncharged Lewis acids, ionic compounds having Lewis-acid cations or ionic compounds containing Brönsted acids as cations is preferably from 0.1 to 20 equivalents, preferably from 1 to 10 equivalents, based on the metallocene compound.

Suitable cation-forming compounds also include boron-aluminum compounds such as di[bis(pentafluorophenylboroxy)]methylalane. Such boron-aluminum compounds are disclosed, for example, in WO 99/06414.

It is also possible to use mixtures of all of the abovementioned cation-forming compounds. Preferred mixtures comprise aluminoxanes, in particular methylaluminoxane, and an ionic compound, in particular one containing the tetrakis(pentafluorophenyl)borate anion, and/or a strong uncharged Lewis acid, in particular tris(pentafluorophenyl)borane.

Preference is given to using both the metallocene compound and the cation-forming compound in a solvent, preferably aromatic hydrocarbons having from 6 to 20 carbon atoms, in particular xylenes and toluene.

The preferred catalyst systems based on metallocene compounds can further comprise, as additional component, a metal compound of the formula (XIII), $$M^3(R^{22})_r(R^{23})_s(R^{24})_t \tag{XIII}$$

where $M^3$ is an alkali metal, an alkaline earth metal or a metal of group 13 of the Periodic Table, i.e. boron, aluminum, gallium, indium or thallium, $R^{22}$ is hydrogen, $C_1$-$C_{10}$-alkyl, $C_6$-$C_{15}$-aryl, alkylaryl or arylalkyl each having from 1 to 10 carbon atoms in the alkyl part and from 6 to 20 carbon atoms in the aryl part, $R^{23}$ and $R^{24}$ are each hydrogen, halogen, $C_1$-$C_{10}$-alkyl, $C_6$-$C_{15}$-aryl, alkylaryl, arylalkyl or alkoxy each having from 1 to 10 carbon atoms in the alkyl radical and from 6 to 20 carbon atoms in the aryl radical, r is an integer from 1 to 3 and s and t are integers from 0 to 2, where the sum r+s+t corresponds to the valence of $M^3$, where the metal compound of the formula (XIII) is not identical to the cation-forming compound. It is also possible to use mixtures of various metal compounds of the formula (XIII).

Among metal compounds of the formula (XIII), preference is given to those in which
$M^3$ is lithium, magnesium or aluminum and
$R^{23}$ and $R^{24}$ are each $C_1$-$C_{10}$-alkyl.

Particularly preferred metal compounds of the formula (XIII) are n-butyllithium, n-butyl-n-octylmagnesium, n-butyl-n-heptylmagnesium, tri-n-hexylaluminum, triisobutylaluminum, triethylaluminum and trimethylaluminum and mixtures thereof.

If a metal compound of the formula (XIII) is used, it is preferably used in such an amount that the molar ratio of $M^3$ from formula (XIII) to the transition metal from the metallocene compound is from 800:1 to 1:1, in particular from 200:1 to 2:1.

The preferred catalyst systems based on metallocene compounds are usually used in supported form. Suitable supports are, for example, porous organic or inorganic inert solids such as finely divided polymer powders, talc, sheet silicates or inorganic oxides. Inorganic oxides suitable as supports may be found among the oxides of elements of groups 2, 3, 4, 5, 13, 14, 15 and 16 of the Periodic Table of the Elements. Preference is given to oxides or mixed oxides of the elements calcium, aluminum, silicon, magnesium or titanium and also corresponding oxide mixtures. Other inorganic oxides which can be used alone or in combination with the abovementioned oxidic supports are, for example, $ZrO_2$ or $B_2O_3$. Preferred oxides are silicon dioxide and aluminum oxide, in particular silica gels or pyrogenic silicas. An example of a preferred mixed oxide is calcined hydrotalcite.

The support materials used preferably have a specific surface area in the range from 10 to 1000 $m^2/g$, preferably from 50 to 500 $m^2/g$ and in particular from 200 to 400 $m^2/g$, and a pore volume in the range from 0.1 to 5 ml/g, preferably from 0.5 to 3.5 ml/g and in particular from 0.8 to 3.0 ml/g. The mean particle size of the finely divided supports is generally in the range from 1 to 500 µm, preferably from 5 to 350 µm and in particular from 10 to 100 µm.

In the preparation of the propylene copolymers present in the propylene copolymer compositions of the present invention, preference is given to firstly forming the propylene copolymer A in a first step by polymerizing from 80% by weight to 99% by weight, based on the total weight of the mixture, of propylene in the presence of further olefins, usually at from 40° C. to 120° C. and pressures in the range from 0.5 bar to 200 bar. The polymer obtainable by means of this reaction subsequently has a mixture of from 2 to 95% by weight of propylene and from 5% to 98% by weight of further olefins polymerized onto it in a second step, usually at from 40° C. to 120° C. and pressures in the range from 0.5 bar to 200 bar. The polymerization of the propylene copolymer A is preferably carried out at from 60 to 80° C., particularly preferably from 65 to 75° C., and a pressure of from 5 to 100 bar, particularly preferably from 10 bar to 50 bar. The polymerization of the propylene copolymer B is preferably carried out at from 60 to 80° C., particularly preferably from 65 to 75° C., and a pressure of from 5 to 100 bar, particularly preferably from 10 bar to 50 bar.

In the polymerization, it is possible to use customary additives, for example molar mass regulators such as hydrogen or inert gases such as nitrogen or argon.

The amounts of the monomers added in the individual steps and also the process conditions such as pressure, temperature or the addition of molar mass regulators such as hydrogen is chosen so that the polymers formed have the desired properties. The scope of the invention includes the technical teaching that a propylene copolymer composition which has a low stiffness and at the same time a good transparency is obtainable, for example, by setting defined comonomer contents of the propylene copolymers A and B and the viscosity ratio of propylene copolymer A to propylene copolymer B.

The composition of the propylene copolymer B has significant effects on the transparency of the propylene copolymer compositions of the present invention. A reduction in the comonomer content of the propylene copolymer B leads to an improved transparency, while at the same time the stiffness of the matrix also decreases as a result of the better compatibility with the propylene copolymer B. The propylene copolymer B, or constituents of the propylene copolymer B, thus act as plasticizer(s) for the matrix. An increase in the comonomer content of the propylene copolymer B results in an improvement in the impact toughness, particularly at low temperatures, but at the expense of the transparency. In addition, the proportion of propylene copolymer B which is miscible with the matrix and acts as plasticizer is decreased, as a result of which the stiffness of the copolymer increases. At the same time, it is also possible to decrease the stiffness by increasing the proportion of the propylene copolymer B. Accordingly, the products of the present invention display an advantageous combination of these properties, i.e. flexible products which are at the same time transparent are obtained. In the case of the preferred use of ethylene as comonomer, particular preference is given to setting an ethylene content of the propylene copolymers B of from 10 to 20% by weight, in particular from 12 to 18% by weight and particularly preferably about 16% by weight. The transparency of the propylene copolymer compositions of the present invention is virtually independent of the proportion of the propylene copolymer B present therein.

Adjustment of the viscosity ratio of propylene copolymer A to propylene copolymer B influences the dispersion of the propylene copolymer B in the polymer matrix and thus has effects on the transparency of the propylene copolymer compositions and on the mechanical properties.

The propylene copolymer compositions of the present invention display a high flexibility in combination with a good transparency. Furthermore, they have low proportions of n-hexane-soluble material, good stress whitening behavior and also a good impact toughness at low temperatures in combination with a homogeneous comonomer distribution and good organoleptics. Since the temperature for the brittle/tough transition is below −15° C., the propylene copolymer compositions of the present invention can also be used in a temperature range which places high demands on the material properties of the multiphase copolymers at temperatures below freezing point. A further advantage is that the shrinkage behavior of the propylene copolymer compositions corresponds to that of propylene polymers. In the case of moldings consisting of different materials, for example containers which have been produced from one propylene polymer and are to be closed with a flexible lid, this leads to advantages in respect of accuracy of fit and freedom from leaks, in particular when the containers are subjected to washing at elevated temperatures. This opens up wide-ranging new possibilities for the use of the propylene copolymer compositions of the present invention in transparent applications.

The multiphase copolymers of the present invention are suitable for producing fibers, films or moldings, in particular for producing injection-molded parts, films, sheets or large hollow bodies, e.g. by means of injection-molding or extrusion processes. Possible applications are the fields of packaging, household articles, containers for storage and transport, office articles, electrical equipment, toys, laboratory requisites, motor vehicle components and gardening requisites, in each case especially for applications at low temperatures.

The invention is illustrated by the following preferred examples which do not restrict the scope of the invention:

EXAMPLES

Preparation of the Metallocene Catalyst 3 kg of Sylopol 948 were placed in a process filter whose filter plate pointed downward and suspended in 15 l of toluene. 7 l of 30% strength by weight MAO solution (from Albemarle) were metered in while stirring at such a rate that the internal temperature did not exceed 35° C. After stirring for a further 1 hour at a low stirrer speed, the suspension was filtered, firstly with no applied pressure and then under a nitrogen pressure of 3 bar. Parallel to the treatment of the support material, 2.0 l of 30% strength by weight MAO solution were placed in a reaction vessel, 92.3 g of rac-dimethylsilyl(2-methyl-4-(para-tert-butylphenyl)indenyl)(2-isopropyl-4-(para-tert-butylphenyl)indenyl)zirconium dichloride were added, the solution was stirred for 1 hour and allowed to settle for a further 30 minutes. The solution was subsequently run onto the pretreated support material with the outlet closed. After the addition was complete, the outlet was opened and the filtrate was allowed to run off. The outlet was subsequently closed, the filter cake was stirred for 15 minutes and allowed to stand for 1 hour. The liquid was then pressed out from the filter cake by means of a nitrogen pressure of 3 bar with the outlet open. 15 l of isododecane were added to the solid which remained, the mixture was stirred for 15 minutes and filtered. The washing step was repeated and the filter cake was subsequently pressed dry by means of a nitrogen pressure of 3 bar. For use in the polymerization, the total amount of the catalyst was resuspended in 15 l of isododecane.

Polymerization

The process was carried out in two stirring autoclaves which were connected in series and each had a utilizable capacity of 200 l and were equipped with a free-standing helical stirrer. Both reactors contained an agitated fixed bed of finely divided propylene polymer.

Propylene and ethylene were passed in gaseous form into the first polymerization reactor and polymerized at a mean residence time as shown in Table 1 by means of the metallocene catalyst at a pressure and temperature as shown in Table 1. The amount of metallocene catalyst metered in was such that the amount of polymer transferred from the first polymerization reactor into the second polymerization reactor corresponded, on average, to the amounts shown in Table 1. The metallocene catalyst was metered in together with the Frisch propylene added to regulate the pressure. Triethylaluminum in the form of a 1 molar solution in heptane was likewise metered into the reactor.

The propylene copolymer obtained in the first gas-phase reactor was transferred together with still active catalyst constituents into the second gas-phase reactor. There, the propylene-ethylene copolymer B was polymerized onto it at a total pressure, a temperature and a mean residence time as shown in Table 1. The ethylene concentration in the reaction gas was monitored by gas chromatography. The weight ratio of the propylene copolymer A formed in the first reactor [A(I)] to the propylene copolymer B formed in the second reactor [B(II)] is shown in Table 1. Isopropanol (in the form of a 0.5 molar solution in heptane) was likewise metered into the second reactor. The weight ratio of the polymer formed in the first reactor to that formed in the second reactor was controlled by means of isopropanol which was metered into the second reactor in the form of a 0.5 molar solution in heptane and is shown in Table 1. To regulate the molar mass, hydrogen was metered into the second reactor as necessary. The proportion of propylene-ethylene copolymer B formed in the second reactor is given by the difference of amount transferred and amount discharged according to the relationship (output from second reactor—output from first reactor)/output from second reactor.

TABLE 1

| Polymerization conditions | |
|---|---|
| | Example 1 |
| Reactor I | |
| Pressure [bar] | 28 |
| Temperature [° C.] | 73 |
| Triethylaluminum, 1 M in heptane [ml/h] | 85 |
| Hydrogen [standard l/h*] | 0 |
| Ethylene [% by volume] | 4 |
| Residence time [h] | 1.5 |
| $C_2$ [% by weight] in powder (IR) | 1.4 |
| Powder MFR (230° C./2.16 kg) [g/10 min]/ISO 1133 | 13.4 |
| Powder output [kg/h] | 30 |
| Reactor II | |
| Pressure [bar] | 18.1 |
| Temperature [° C.] | 75 |
| Ethylene [% by volume] | 40 |
| Hydrogen [standard l/h*] | 8.1 |
| Residence time [h] | 1.1 |
| Powder output [kg/h] | 44 |
| Powder MFR (230° C./2.16 kg) [g/10 min]/ISO 1133 | 14 |
| Content of propylene-ethylene copolymer A [% by weight] | 68 |
| Content of propylene-ethylene copolymer B [% by weight] | 32 |
| Weight ratio of A(I):B(II) | 2.1 |

*Standard l/h: standard liters per hour

The polymer powder obtained in the polymerization was admixed with a standard additive mixture in the granulation step. Granulation was carried out using a twin-screw extruder ZSK 30 from Werner & Pfleiderer at a melt temperature of 250° C. The propylene copolymer composition obtained contained 0.05% by weight of Irganox 1010 (from Ciba Specialty Chemicals), 0.05% by weight of Irgafos 168, (from Ciba Specialty Chemicals), 0.1% by weight of calcium stearate and 0.22% by weight of Millad 3988 (bis-3,4-dimethylbenzylidenesorbitol, from Milliken Chemical).

The properties of the propylene copolymer composition are shown in Tables 2 and 3. The data were determined on the propylene copolymer composition after addition of additives and granulation or on test specimens produced therefrom.

TABLE 2

| Analytical results on the propylene copolymer composition | |
|---|---|
| | Example 1 |
| Proportion of n-hexane-soluble material [% by weight] | 2.4 |
| $C_2$ content (IR) [% by weight] | 6.0 |
| $C_2$ content of propylene-ethylene copolymer B (IR) [% by weight] | 14.3 |
| Limiting viscosity (ISO 1628) [cm$^3$/g] | |
| Propylene-ethylene copolymer A | 141 |
| Propylene-ethylene copolymer B | 126 |
| PEP* ($^{13}$C-NMR) [% by weight] | 4.0 |
| PE$_x$* ($^{13}$C-NMR) [% by weight] | 3.6 |

TABLE 2-continued

Analytical results on the propylene copolymer composition

| | Example 1 |
|---|---|
| PEP/PE$_x$ | 1.11 |
| Glass transition temperatures [° C.] (DMTA, ISO 6721-7) | −7.5**/−30*** |
| Molar mass M$_n$ [g/mol] | 55000 |
| Molar mass distribution [M$_w$/M$_n$] | 3.3 |
| Shear viscosity η$_{100}$ of propylene-ethylene copolymer B**** | 166 |
| Shear viscosity η$_{100}$ of propylene-ethylene copolymer A**** | 190 |
| Ratio of the shear viscosities of propylene-ethylene copolymer B/propylene-ethylene copolymer A (ω = 100 s$^{-1}$)**** | 0.87 |

*The PEP and PE$_x$ values were determined on a propylene-ethylene copolymer which had been separated off from a product which was polymerized under the conditions of Example 1 but without addition of ethylene in the first polymerization step.
**Glass transition temperature of the propylene copolymer A
***Glass transition temperature of the propylene-ethylene copolymer B
****Shear viscosities at a shear rate of 100 s$^{-1}$ and a measurement temperature of 230° C.

TABLE 3

Use-related tests on the propylene copolymer composition

| | Example 1 |
|---|---|
| MFR (230° C./2.16 kg) [g/10 min]/ISO 1133 | 16.7 |
| DSC melting point [° C.]/ ISO 3146 | 144 |
| Vicat A softening temperature [° C.]/ISO 306 VST/A50 | 116 |
| Heat distortion resistance HDT B [° C.]/ISO 75-2 meth. B | 56 |
| Tensile E modulus [MPa]/ISO 527 | 481 |
| Elongation at break, nominal [%] | 630 |
| Brittle/tough transition temperature [° C.] | −19 |
| Charpy impact toughness (+23° C.) [kJ/m$^2$]/ISO 179-2/1eU | NF |
| Charpy impact toughness (0° C.) [kJ/m$^2$]/ISO 179-2/1eU | NF |
| Charpy impact toughness (−20° C.) [kJ/m$^2$]/ISO 179-2/1eU | 257 |
| Charpy notched impact toughness (+23° C.) [kJ/m$^2$]/ISO 179-2/1eA | 45.0 |
| Charpy notched impact toughness (0° C.) [kJ/m$^2$]/ISO 179-2/1eA | 32.5 |
| Charpy notched impact toughness (−20° C.) [kJ/m$^2$]/ISO 179-2/1eA | 2.5 |
| Haze (1 mm*) [%]/ASTM D 1003 | 7 |
| Stress whitening (23° C.) [mm]/dome method | 0 |

NF: no fracture
*Injection-molded plates having a thickness of 1 mm.

Analysis

The production of the test specimens required for the use-related tests and the tests themselves were carried out in accordance with the standards indicated in Table 3.

To determine analytical data on product fractions, the polymer prepared was fractionated by means of TREF as described by L. Wild, "Temperature Rising Elution Fractionation", Advanced Polym. Sci. 98, 1-47, 1990, in xylene. Fractions were eluted at 40, 70, 80, 90, 95, 100, 110 and 125° C. and assigned to the propylene copolymer A prepared in reactor I or the propylene copolymer B prepared in reactor II. As propylene-ethylene copolymer B, use was made of the combined fractions of a TREF eluted at temperatures up to and including 70° C. As propylene-ethylene copolymer A, use was made of the combined fractions of a TREF eluted above 70° C.

The proportion of n-hexane-soluble material was determined by extraction using a modified FDA method. About 2.5 g of granules were weighed out and suspended in 1 l of n-hexane. The suspension was heated to 50° C.±0.2° C. over a period of 20-25 minutes while stirring and stirred for a further 2 hours at this temperature. The suspension was filtered through a glass frit which had been preheated to 50° C. About 350 g of the filtrate were weighed into an evaporator flask which had previously been dried over P$_2$O$_5$ in a desiccator for 12 hours. The filtrate was evaporated to about 20-30 ml at 60° C. under reduced pressure on a rotary evaporator. The solution was transferred quantitatively with the aid of several rinses with warm hexane into a 200 ml evaporating basin which had previously been dried over P$_2$O$_5$ in a desiccator for 12 hours and weighed. The solution was evaporated to dryness on a hotplate while passing nitrogen over it. After evaporation, the evaporating basin was dried over P$_2$O$_5$ at 200 mbar in a desiccator for 12 hours, weighed and the extraction residue was determined. The same procedure was repeated without addition of polymer granules and the residue in pure n-hexane was determined. The residue in pure n-hexane was subtracted to determine the proportion of material which is extracted by n-hexane.

The brittle/tough transition was determined by means of the puncture test described in ISO 6603-2/40/20/C/4.4. The velocity of the punch was chosen as 4.4 m/s, the diameter of the support ring was 40 mm and the diameter of the impact ring was 20 mm. The test specimen was clamped in. The test specimen geometry was 6 cm×6 cm at a thickness of 2 mm. To determine the temperature dependence curve, measurements were carried out at steps of 2° C. in the temperature range from 26° C. to −35° C. using a test specimen preheated/precooled to the respective temperature.

In the present example, the brittle/tough transition was determined from the total deformation in mm defined as the displacement through which the punch has traveled when the force has passed through a maximum and dropped to 3% of this maximum force. For the purposes of the present invention, the brittle/tough transition temperature is defined as the temperature at which the total deformation is at least 25% below the mean total deformation of the preceding 5 measurement points.

The determination of the Haze values was carried out in accordance with the standard ASTM D 1003. The values were determined on samples containing 2200 ppm of Millad 3988. The test specimens were injection-molded plates having an edge length of 6×6 cm and a thickness of 1 mm. The test specimens were injection molded at a melt temperature of 250° C. and a tool surface temperature of 30° C. After a storage time of 7 days at room temperature for after-crystallization, the test specimens were clamped into the clamping device in front of the inlet orifice of a Hazegard System XL 211 from Pacific Scientific and the measurement was subsequently carried out. Testing was carried out at 23° C., with each test specimen being examined once in the middle. To obtain a mean, 5 test specimens were tested in each case.

The stress whitening behavior was assessed by means of the domed method. In the dome method, the stress whitening was determined by means of a falling dart apparatus as specified in DIN 53443 Part 1 using a falling dart having a mass of 250 g, a punch diameter of 5 mm and a dome radius of 25 mm. The drop was 50 cm. As test specimen, use was made of an injection-molded circular disk having a diameter of 60 mm and a thickness of 2 mm. The test specimen was injection molded at a melt temperature of 250° C. and a tool surface temperature of 30° C. Testing was carried out at 23° C., with each test specimen being subjected to only one impact test. The test specimen was first laid on a support ring without being clamped and the falling dart was subsequently released. To obtain the mean, at least five test specimens were tested.

The diameter of the visible stress whitening region is reported in mm and was determined by measuring this region in the flow direction and perpendicular thereto on the side of the circular disk opposite that on which impact occurs and forming the mean of the two values.

The $C_2$ content of the propylene-ethylene copolymers was determined by means of IR spectroscopy.

The structure of the propylene-ethylene copolymer B was determined by means of $^{13}C$-NMR spectroscopy.

The E modulus was measured in accordance with ISO 527-2:1993. The test specimen of type 1 having a total length of 150 mm and a parallel section of 80 mm was injection molded at a melt temperature of 250° C. and a tool surface temperature of 30° C. To allow after-crystallization to occur, the test specimen was stored for 7 days under standard conditions of 23° C./50% atmospheric humidity. A test unit model Z022 from Zwick-Roell was used for testing. The displacement measurement system in the determination of the E modulus had a resolution of 1 μm. The testing velocity in the determination of the E modulus was 1 mm/min, otherwise 50 mm/min. The yield point in the determination of the E modulus was in the range 0.05%-0.25%.

The determination of the melting point was carried out by means of DSC (differential scanning calorimetry). The measurement was carried out in accordance with ISO standard 3146 using a first heating step at a heating rate of 20° C. per minute up to 200° C., a dynamic crystallization at a cooled rate of 20° C. per minute down to 25° C. and a second heating step at a heating rate of 20° C. per minute back up to 200° C. The melting point is then the temperature at which the enthalpy versus temperature curve measured during the second heating step displays a maximum.

The determination of the molar mass $M_n$ and the molar mass distribution $M_w/M_n$ was carried out by gel permeation chromatography (GPC) at 145° C. in 1,2,4-trichlorobenzene using a GPC apparatus model 150C from Waters. The data were evaluated by means of the Win-GPC software from HS-Entwicklungsgesellschaft für wissenschaftliche Hard- und Software mbH, Ober-Hilbersheim. The columns were calibrated by means of polypropylene standards having molar masses from 100 to $10^7$ g/mol.

The determination of the limiting viscosity, namely the limiting value of the viscosity number when the polymer concentration is extrapolated to zero, was carried out in decalin at 135° C. in accordance with ISO 1628.

The shear viscosities were determined by a method based on ISO 6721-10 (RDS apparatus with plate/plate geometry, diameter=25 mm, amplitude=0.05-0.5, preheating time=10-12 min, T=200-230° C.). The ratio of the shear viscosity of propylene copolymer B to that of propylene copolymer A was determined at a shear rate of 100 s$^{-1}$. The measurement temperature was 220-230° C.

To determine the glass transition temperature by means of DMTA in accordance with ISO 6721-7, a test specimen having dimensions of 10 mm×60 mm and a thickness of 1 mm was stamped from a sheet pressed from the melt, 210° C., 7 min at 30 bar, cooling rate after completion of pressing=15 K/min. This test specimen was clamped in the apparatus and the measurement was commenced at −100° C. The heating rate was 2.5 K/min and the measurement frequency was 1 Hz.

The invention claimed is:

1. A propylene copolymer composition comprising:
A) a propylene copolymer containing from 1 to 20% by weight of olefins other than propylene; and
B) at least one propylene copolymer containing from 10 to 30% by weight of olefins other than propylene, where the propylene copolymer A and the propylene copolymer B are present as separate phases and a portion of n-hexane soluble material is ≦2.6% by weight, the propylene copolymer composition comprising a tensile E modulus ranging from 150 MPa to 800 MPa, and the propylene copolymer composition is obtained from a polymerization process comprising at least two successive polymerization steps, wherein a catalyst system comprising a metallocene compound is used in each successive polymerization step; wherein the metallocene compound is of formula VIII:

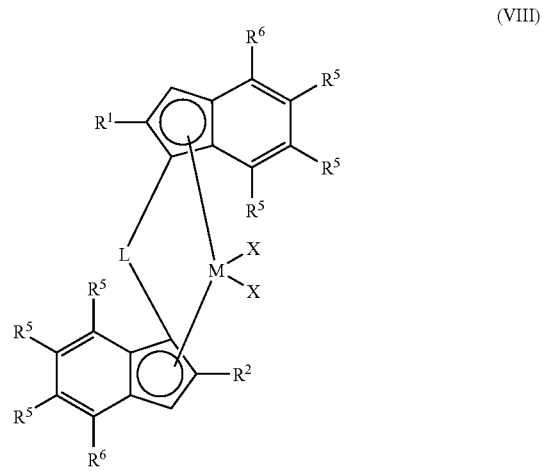

(VIII)

wherein:

M is zirconium, hafnium or titanium;

X are identical or different and are each, independently of one another, hydrogen or halogen or an —R, —OR, —OSO$_2$CF$_3$, —OCOR, —SR, —NR$_2$ or —PR$_2$ group, where R is linear or branched C$_1$-C$_{20}$-alkyl, C$_3$-C$_{20}$-cycloalkyl which are optionally substituted by one or more C$_1$-C$_{10}$-alkyl radicals, C$_6$-C$_{20}$-aryl, C$_7$-C$_{20}$-alkylaryl or C$_7$-C$_{20}$-arylalkyl and optionally comprise one or more heteroatoms of groups 13-17 of the Periodic Table of the Elements or one or more unsaturated bonds, where two X are optionally joined to one another and form a C$_4$-C$_{40}$-dienyl ligand, or X is an —OR'O— group in which the substituent R' is a divalent group selected from the group consisting of C$_1$-C$_{40}$-alkylidene, C$_6$-C$_{40}$-arylidene, C$_7$-C$_{40}$-alkylarylidene and C$_7$-C$_{40}$-arylalkylidene;

L is a radical selected from the group consisting of —SiMe$_2$, —SiPh$_2$, —SiPhMe-, —SiMe(SiMe$_3$)-, —CH$_2$—, —(CH$_2$)$_2$, —(CH$_2$)$_3$— and —C(CH$_3$)$_2$—;

R$^1$ is a linear or branched C$_1$-C$_{10}$-alkyl group which is unbranched in the α position;

R$^2$ is a group of the formula —C(R$^3$)$_2$R$^4$;

R$^3$ is a linear or branched C$_1$-C$_{10}$-alkyl group;

R$^4$ is hydrogen;

R$^5$ are identical or different and are each, independently of one another, hydrogen or halogen or linear or branched C$_1$-C$_{20}$-alkyl, C$_3$-C$_{20}$-cycloalkyl optionally substituted by one or more C$_1$-C$_{10}$-alkyl radicals, C$_6$-C$_{20}$-aryl, C$_7$-C$_{20}$-alkylaryl or C$_7$-C$_{20}$-arylalkyl and optionally comprise one or more heteroatoms of groups 13-17 of the Periodic Table of the Elements or one or more unsaturated bonds;

$R^6$ is an aryl group of the formula (VII),

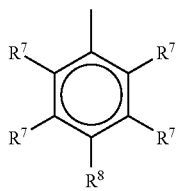

(VII)

where $R^7$ are identical or different and are each, independently of one another, hydrogen or halogen or linear or branched $C_1$-$C_{20}$-alkyl, $C_3$-$C_{20}$-cycloalkyl which are optionally substituted by one or more $C_1$-$C_{10}$-alkyl radicals, $C_6$-$C_{20}$-aryl, $C_7$-$C_{20}$-alkylaryl or $C_7$-$C_{20}$-arylalkyl and optionally comprise one or more heteroatoms of groups 13-17 of the Periodic Table of the Elements or one or more unsaturated bonds; or two $R^7$ are optionally joined to form a saturated or unsaturated $C_3$-$C_{20}$ ring; and $R^8$ is hydrogen or halogen or linear or branched $C_1$-$C_{20}$-alkyl, $C_3$-$C_{20}$-cycloalkyl which are optionally substituted by one or more $C_1$-$C_{10}$-alkyl radicals, $C_6$-$C_{20}$-aryl, $C_7$-$C_{20}$-alkylaryl or $C_7$-$C_{20}$-arylalkyl and optionally comprise one or more heteroatoms of groups 13-17 of the Periodic Table of the Elements or one or more unsaturated bonds.

2. The propylene copolymer composition as claimed in claim 1, wherein the propylene copolymer composition has a haze value of ≦30%, and the tensile E modulus ranges from 200 MPa to 500 MPa.

3. The propylene copolymer composition as claimed in claim 1, wherein the olefin other than propylene in the propylene copolymer A), the propylene copolymer B), or both is ethylene.

4. The propylene copolymer composition as claimed in claim 1, wherein a weight ratio of propylene copolymer A to propylene copolymer B is in the range from 90:10 to 20:80.

5. The propylene copolymer composition as claimed in claim 1, comprising from 0.1 to 1% by weight, based on the total weight of the propylene copolymer composition, of a nucleating agent.

6. The propylene copolymer composition as claimed in claim 1, wherein a glass transition temperature of the propylene copolymer B determined by means of DMTA (dynamic mechanical thermal analysis) is in the range from −20° C. to −40° C.

7. The propylene copolymer composition as claimed in claim 1, wherein a molar mass distribution Mw/Mn is in the range from 1.5 to 3.5.

8. The propylene copolymer composition as claimed in claim 1 which has a number average molecular mass Mn in the range from 50,000 g/mol to 500,000 g/mol.

9. A process for preparing a propylene copolymer composition comprising:
A) a propylene copolymer containing from 1 to 20% by weight of olefins other than propylene; and
B) at least one propylene copolymer containing from 10 to 30% by weight of olefins other than propylene,
where the propylene copolymer A and the propylene copolymer B are present as separate phases and a portion of n-hexane soluble material is ≦2.6% by weight, the propylene copolymer composition comprising a tensile E modulus ranging from 150 MPa to 800 MPa;
the process comprising polymerizing monomers in a multistage polymerization process comprising at least two successive polymerization steps and a catalyst system comprising a metallocene compound, wherein the catalyst system is used in each successive polymerization step; wherein the metallocene compound is of formula VIII:

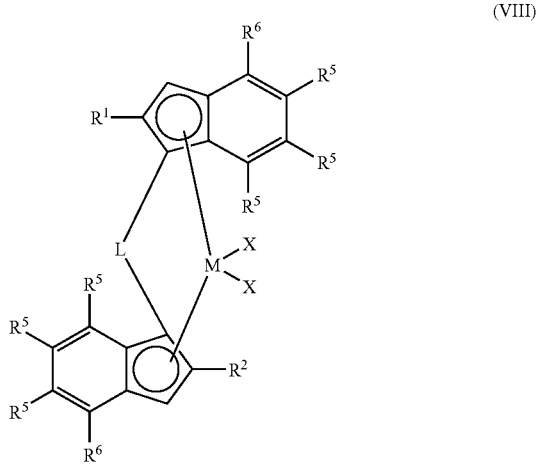

(VIII)

wherein:

M is zirconium, hafnium or titanium;

X are identical or different and are each, independently of one another, hydrogen or halogen or an —R, —OR, —OSO$_2$CF$_3$, —OCOR, —SR, —NR$_2$ or —PR$_2$ group, where R is linear or branched $C_1$-$C_{20}$-alkyl, $C_3$-$C_{20}$-cycloalkyl which are optionally substituted by one or more $C_1$-$C_{10}$-alkyl radicals, $C_6$-$C_{20}$-aryl, $C_7$-$C_{20}$-alkylaryl or $C_7$-$C_{20}$-arylalkyl and optionally comprise one or more heteroatoms of groups 13-17 of the Periodic Table of the Elements or one or more unsaturated bonds, where two X are optionally joined to one another and form a $C_4$-$C_{40}$-dienyl ligand, or X is an —OR'O— group in which the substituent R' is a divalent group selected from the group consisting of $C_1$-$C_{40}$-alkylidene, $C_6$-$C_{40}$-arylidene, $C_7$-$C_{40}$-alkylarylidene and $C_7$-$C_{40}$-arylalkylidene;

L is a radical selected from the group consisting of —SiMe$_2$-, —SiPh$_2$-, —SiPhMe-, —SiMe(SiMe$_3$)-, —CH$_2$—, —(CH$_2$)$_2$, —(CH$_2$)$_3$— and —C(CH$_3$)$_2$—;

$R^1$ is a linear or branched $C_1$-$C_{10}$-alkyl group which is unbranched in the α position;

$R^2$ is a group the formula —C(R$^3$)$_2$R$^4$;

$R^3$ is a linear or branched $C_1$-$C_{10}$-alkyl group;

$R^4$ is hydrogen;

$R^5$ are identical or different and are each, independently of one another, hydrogen or halogen or linear or branched $C_1$-$C_{20}$-alkyl, $C_3$-$C_{20}$-cycloalkyl optionally substituted by one or more $C_1$-$C_{10}$-alkyl radicals, $C_6$-$C_{20}$-aryl, $C_7$-$C_{20}$-alkylaryl or $C_7$-$C_{20}$-arylalkyl and optionally comprise one or more heteroatoms of groups 13-17 of the Periodic Table of the Elements or one or more unsaturated bonds;

$R^6$ is an aryl group of the formula (VII),

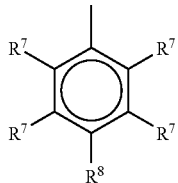

(VII)

where
$R^7$ are identical or different and are each, independently of one another, hydrogen or halogen or linear or branched $C_1$-$C_{20}$-alkyl, $C_3$-$C_{20}$-cycloalkyl which are optionally substituted by one or more $C_1$-$C_{10}$-alkyl radicals, $C_6$-$C_{20}$-aryl, $C_7$-$C_{20}$-alkylaryl or $C_7$-$C_{20}$-arylalkyl and optionally comprise one or more heteroatoms of groups 13-17 of the Periodic Table of the Elements or one or more unsaturated bonds; or two $R^7$ are optionally joined to form a saturated or unsaturated $C_3$-$C_{20}$ ring; and $R^8$ is hydrogen or halogen or linear or branched $C_1$-$C_{20}$-alkyl, $C_3$-$C_{20}$-cycloalkyl which are optionally substituted by one or more $C_1$-$C_{10}$-alkyl radicals, $C_6$-$C_{20}$-aryl, $C_7$-$C_{20}$-alkylaryl or $C_7$-$C_{20}$-arylalkyl and optionally comprise one or more heteroatoms of groups 13-17 of the Periodic Table of the Elements or one or more unsaturated bonds.

10. A process comprising producing fibers, films or moldings from a propylene copolymer composition, the process comprising extruding or injection-molding, the propylene copolymer composition, the propylene copolymer composition comprising:
A) a propylene copolymer containing from 1 to 20% by weight of olefins other than propylene; and
B) at least one propylene copolymer containing from 10 to 30% by weight of olefins other than propylene,
where the propylene copolymer A and the propylene copolymer B are present as separate phases and a portion of n-hexane soluble material is ≦2.6% by weight, the propylene copolymer composition comprising a tensile E modulus ranging from 150 MPa to 800 MPa, and the propylene copolymer composition is obtained from a polymerization process comprising at least two successive polymerization steps, wherein a catalyst system comprising a metallocene compound is used in each successive polymerization step; wherein the metallocene compound is of formula VIII:

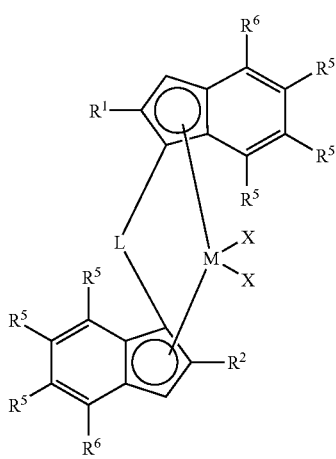

(VIII)

wherein:
M is zirconium, hafnium or titanium;
X are identical or different and are each, independently of one another, hydrogen or halogen or an —R, —OR, —OSO$_2$CF$_3$, —OCOR, —SR, —NR$_2$ or —PR$_2$ group, where R is linear or branched $C_1$-$C_{20}$-alkyl, $C_3$-$C_{20}$-cycloalkyl which are optionally substituted by one or more $C_1$-$C_{10}$-alkyl radicals, $C_6$-$C_{20}$-aryl, $C_7$-$C_{20}$-alkylaryl or $C_7$-$C_{20}$-arylalkyl and optionally comprise one or more heteroatoms of groups 13-17 of the Periodic Table of the Elements or one or more unsaturated bonds, where two X are optionally joined to one another and form a $C_4$-$C_{40}$-dienyl ligand, or X is an —OR'O— group in which the substituent R' is a divalent group selected from the group consisting of $C_1$-$C_{40}$-alkylidene, $C_6$-$C_{40}$-arylidene, $C_7$-$C_{40}$-alkylarylidene and $C_7$-$C_{40}$-arylalkylidene;

L is a radical selected from the group consisting of —SiMe$_2$-, —SiPh$_2$-, —SiPhMe-, —SiMe(SiMe$_3$)-, —CH$_2$—, —(CH$_2$)$_2$—, —(CH$_2$)$_3$— and —C(CH$_3$)$_2$—;

$R^1$ is a linear or branched $C_1$-$C_{10}$-alkyl group which is unbranched in the α position;

$R^2$ is a group of the formula —C(R$^3$)$_2$R$^4$;

$R^3$ is a linear or branched $C_1$-$C_{10}$-alkyl group;

$R^4$ is hydrogen;

$R^5$ are identical or different and are each, independently of one another, hydrogen or halogen or linear or branched $C_1$-$C_{20}$-alkyl, $C_3$-$C_{20}$-cycloalkyl optionally substituted by one or more $C_1$-$C_{10}$-alkyl radicals, $C_6$-$C_{20}$-aryl, $C_7$-$C_{20}$-alkylaryl or $C_7$-$C_{20}$-arylalkyl and optionally comprise one or more heteroatoms of groups 13-17 of the Periodic Table of the Elements or one or more unsaturated bonds;

$R^6$ is an aryl group of the formula (VII),

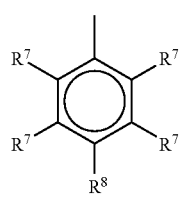

(VII)

where
$R^7$ are identical or different and are each, independently of one another, hydrogen or halogen or linear or branched $C_1$-$C_{20}$-alkyl, $C_3$-$C_{20}$-cycloalkyl which are optionally substituted by one or more $C_1$-$C_{10}$-alkyl radicals, $C_6$-$C_{20}$-aryl, $C_7$-$C_{20}$-alkylaryl or $C_7$-$C_{20}$-arylalkyl and optionally comprise one or more heteroatoms of groups 13-17 of the Periodic Table of the Elements or one or more unsaturated bonds; or two $R^7$ are optionally joined to form a saturated or unsaturated $C_3$-$C_{20}$ ring; and $R^8$ is hydrogen or halogen or linear or branched $C_1$-$C_{20}$-alkyl, $C_3$-$C_{20}$-cycloalkyl which are optionally substituted by one or more $C_1$-$C_{10}$-alkyl radicals, $C_6$-$C_{20}$-aryl, $C_7$-$C_{20}$-alkylaryl or $C_1$-$C_{20}$-arylalkyl and optionally comprise one or more heteroatoms of groups 13-17 of the Periodic Table of the Elements or one or more unsaturated bonds.

11. A fiber, film or molding comprising a propylene copolymer composition comprising A) a propylene copolymer containing from 1 to 20% by weight of olefins other than propylene; and B) at least one propylene copolymer containing from 10 to 30% by weight of olefins other than propylene, where the propylene copolymer A and the propylene copolymer B are present as separate phases and a portion of n-hexane soluble material is $\leq 2.6\%$ by weight, the propylene copolymer composition comprising a tensile E modulus ranging from 150 MPa to 800 MPa, and the propylene copolymer composition is obtained from a polymerization process comprising at least two successive polymerization steps, wherein a catalyst system comprising a metallocene compound is used in each successive polymerization step; wherein the metallocene compound is of formula VIII:

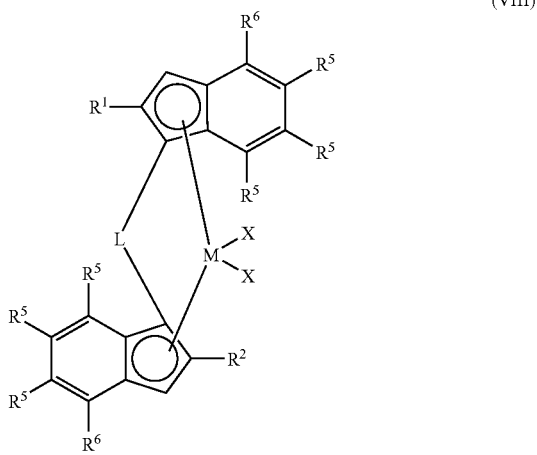

(VIII)

wherein:

M is zirconium, hafnium or titanium;

X are identical or different and are each, independently of one another, hydrogen or halogen or an —R, —OR, —OSO$_2$CF$_3$, —OCOR, —SR, —NR$_2$ or —PR$_2$ group, where R is linear or branched C$_1$-C$_{20}$-alkyl, C$_3$-C$_{20}$-cycloalkyl which are optionally substituted by one or more C$_1$-C$_{10}$-alkyl radicals, C$_6$-C$_{20}$-aryl, C$_7$-C$_{20}$-alkylaryl or C$_7$-C$_{20}$-arylalkyl and optionally comprise one or more heteroatoms of groups 13-17 of the Periodic Table of the Elements or one or more unsaturated bonds, where two X are optionally joined to one another and form a C$_4$-C$_{40}$-dienyl ligand, or X is an —OR'O— group in which the substituent R' is a divalent group selected from the group consisting of C$_1$-C$_{40}$-alkylidene, C$_6$-C$_{40}$-arylidene, C$_7$-C$_{40}$-alkylarylidene and C$_7$-C$_{40}$-arylalkylidene;

L is a radical selected from the group consisting of —SiMe$_2$-, —SiPh$_2$-, —SiPhMe-, —SiMe(SiMe$_3$)-, —CH$_2$, —(CH$_2$)$_2$—, —(CH$_2$)$_3$— and —C(CH$_3$)$_2$—;

R$^1$ is a linear or branched C$_1$-C$_{10}$-alkyl group which is unbranched in the $\alpha$ position;

R$^2$ is a group of the formula —C(R$^3$)$_2$R$^4$;

R$^3$ is a linear or branched C$_1$-C$_{10}$-alkyl group;

R$^4$ is hydrogen;

R$^5$ are identical or different and are each, independently of one another, hydrogen or halogen or linear or branched C$_1$-C$_{20}$-alkyl, C$_3$-C$_{20}$-cycloalkyl optionally substituted by one or more C$_1$-C$_{10}$-alkyl, C$_6$-C$_{20}$-aryl, C$_7$-C$_{20}$-alkylaryl or C$_7$-C$_{20}$-arylalkyl and optionally comprise one or more heteroatoms of groups 13-17 of the Periodic Table of the Elements or one or more unsaturated bonds;

R$^6$ is an aryl group of the formula (VII),

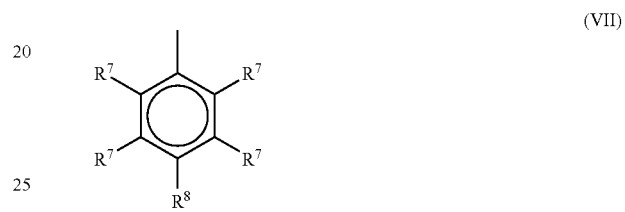

(VII)

where

R$^7$ are identical or different and are each, independently of one another, hydrogen or halogen or linear or branched C$_1$-C$_{20}$-alkyl, C$_3$-C$_{20}$-cycloalkyl which are optionally substituted by one or more C$_1$-C$_{10}$-alkyl radicals, C$_6$-C$_{20}$-aryl, C$_7$-C$_{20}$-alkylaryl or C$_7$-C$_{20}$-arylalkyl and optionally comprise one or more heteroatoms of groups 13-17 of the Periodic Table of the Elements or one or more unsaturated bonds; or two R$^7$ are optionally joined to form a saturated or unsaturated C$_3$-C$_{20}$ ring; and R$^8$ is hydrogen or halogen or linear or branched C$_1$-C$_{20}$-alkyl, C$_3$-C$_{20}$-cycloalkyl which are optionally substituted by one or more C$_1$-C$_{10}$-alkyl radicals, C$_6$-C$_{20}$-aryl, C$_7$-C$_{20}$-alkylaryl or C$_7$-C$_{20}$-arylalkyl and optionally comprise one or more heteroatoms of groups 13-17 of the Periodic Table of the Elements or one or more unsaturated bonds.

12. The propylene copolymer composition as claimed in claim 1, wherein

R$^8$ is —C(R$^9$)$_3$; and

R$^9$ are identical or different and are each, independently of one another, a linear or branched C$_1$-C$_6$-alkyl group, or two or three of R$^9$ are joined to form at least one ring system.

* * * * *